Nov. 25, 1969
J. K. APPLEBY
AIRCRAFT HAVING VARIABLE SWEEP-BACK WINGS

Filed July 6, 1967

INVENTOR
JAMES KENNETH APPLEBY
BY
Nolte & Nolte
ATTORNEYS

Nov. 25, 1969  J. K. APPLEBY  3,480,237
AIRCRAFT HAVING VARIABLE SWEEP-BACK WINGS
Filed July 6, 1967  3 Sheets-Sheet 2

INVENTOR
JAMES KENNETH APPLEBY
BY
Nolte & Nolte
ATTORNEYS

United States Patent Office 3,480,237
Patented Nov. 25, 1969

3,480,237
AIRCRAFT HAVING VARIABLE SWEEP-BACK WINGS
James Kenneth Appleby, Penwortham, Preston, England, assignor to British Aircraft Corporation (Operating) Limited, London, England, a British company
Filed July 6, 1967, Ser. No. 651,522
Claims priority, application Great Britain, July 7, 1966, 30,625/66
Int. Cl. B64c 3/40
U.S. Cl. 244—46                14 Claims

ABSTRACT OF THE DISCLOSURE

An aircraft with variable sweep wings, in which slots in the fuselage sides, which accommodate the wing trailing edges are sealed by inflatable bags, disposed above and below the wing and having wedged shape with the apexes of the wedges pointing into the fuselage.

---

This invention relates to aircraft having wings whose sweep-back can be varied, the trailing edges of the wings entering into slots in the sides of the fuselage as the sweep-back is increased.

It is necessary to provide means for sealing these slots where and when they are not occupied by the wings. It has proved difficult to construct a seal which will fulfill the requirements that it should maintain the contour of the fuselage, with only such minor deviations as may be permissible or desirable, offer a minimum resistance to wing sweep movement, and locate against the wing surfaces so as to prevent flow of air between regions of differential pressure with resulting loss of lift.

According to the present invention, each slot is provided with a seal comprising a number of wedge-shaped inflatable bags mounted within the slot with their apexes pointing into the interior of the fuselage and their parallel sides substantially vertical, so that, when the bags are inflated and the wing is in its position of minimum sweep-back, the bags fill the slot opening and their external surfaces conform with the fuselage contour, while the bags are capable of yielding resiliently to admit the trailing edge of the respective wing when the angle of sweep-back is increased.

Preferably the seal comprises upper and lower portions, disposed respectively above and below the median plane of the wing sweep movement, each said portion comprising one or more rows of the wedge-shaped bags.

The upper and lower portions of the seal are preferably each covered on the surface exposed to the airstream by a continuous stretched skin giving a relatively smooth surface when the bags are inflated. The bags in each row may be interconnected for the purpose of inflation or deflation, or alternatively all the bags can be interconnected. Also if required the upper and lower portions of the seal may be separately inflated to different pressures to suit different relative ambient pressures on the outside of the fuselage above and below the wing.

When the trailing edge of the wing enters the slot the lips of the seal (i.e. the facing surfaces of the upper and lower portions of the seal), will deform or crush and will allow entry. A slight deflation of the bags will take place to compensate for the reduction in volume caused but bag pressure on the wing surfaces wil remain substantially unchanged.

Figure 1:
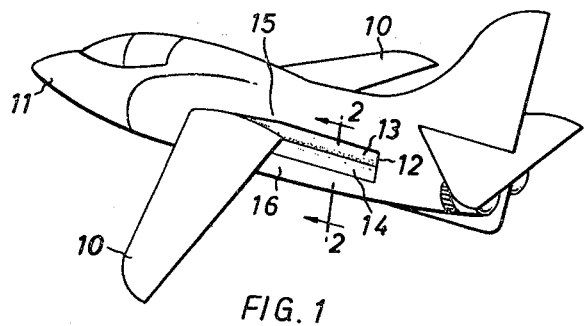
Figure 2:
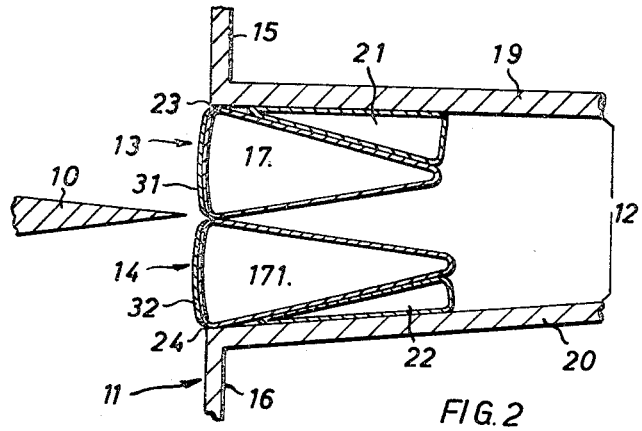
Figure 3:
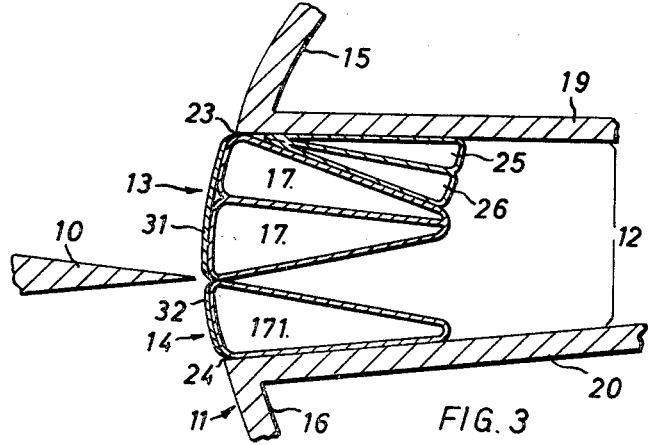
Figure 4:
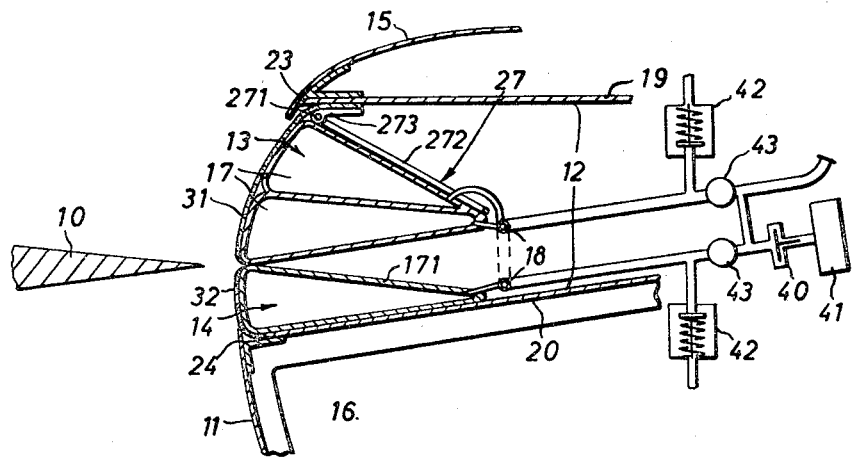
Figure 6:
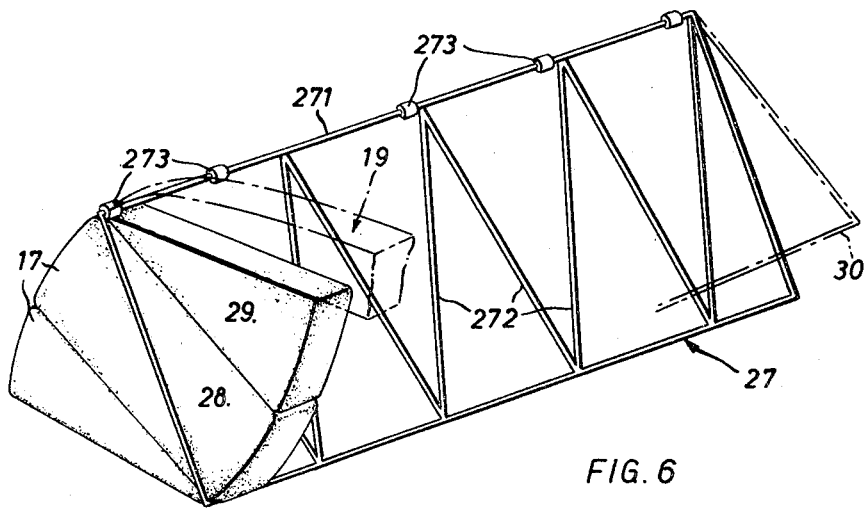
Figure 5:
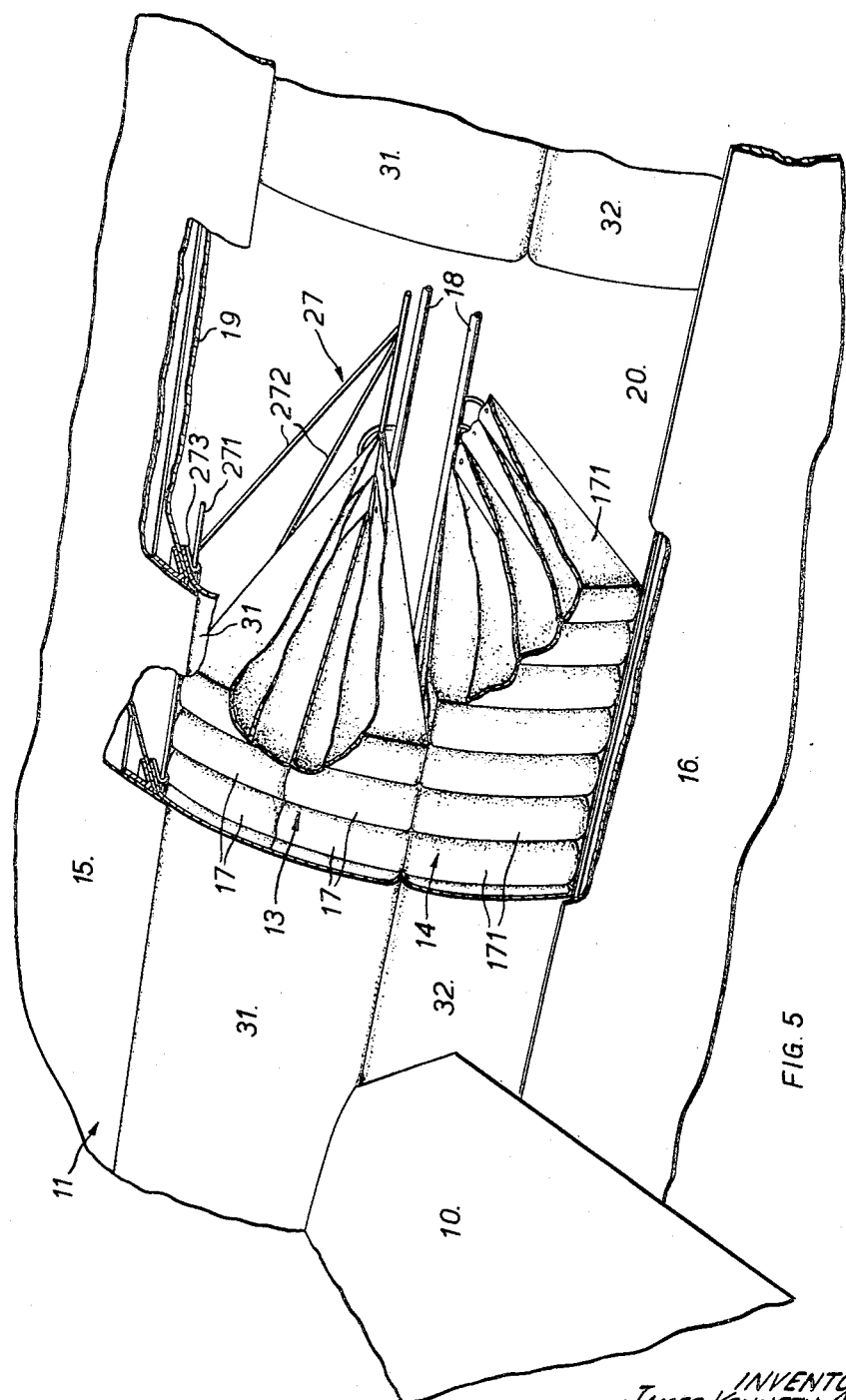

Specific embodiments of the invention will now be described by way of example and with reference to the accompanying drawings, in which:

FIG. 1 is a perspective view of a variable sweep-back wing aircraft,

FIG. 2 is a transverse part-section on line 2—2 of FIG. 1, but to a larger scale, of a first embodiment of the invention, FIG. 3 is a similar transverse part-section of a second embodiment, FIG. 4 is also a similar transverse part-section showing a third embodiment, FIG. 5 is a three-quarter rear view of the fuselage slot and seal of FIG. 4, and FIG. 6 illustrates a framework for mounting the bags as illustrated in FIGS. 4 and 5.

The aircraft shown in FIG. 1 has variable sweep-back wings 10 mounted upon a fuselage 11. An elongated aperture or slot 12 is formed in each side of the fuselage 11 to accommodate the wing trailing edge as the wing sweep-back is increased. The slot 12 has a seal comprising portions 13 and 14 respectively disposed above and below the median plane of wing sweep-back movement. Seal portion 13 will be referred to as the upper seal and 14 as the lower seal.

The fuselage has an upper structure 15 and a side or lower structure 16. The outer surface of the seal, when the wings 10 are in their forward or relatively unswept position as shown in FIG. 1, closely follows the fuselage contour. The upper and lower seals 13, 14 each consist of a series of inflatable wedge-shaped bags 17, 171 (FIGS. 2 to 6) which are mounted adjacent to one another upon the upper and lower fuselage structures 15, 16 respectively. As shown diagrammatically in FIG. 4, the interiors of the bags 17, 171 are connected to pipes 18 which are separate but which can be in communication with one another and which are connected through pressure reducing valves 43 and a non-return valve 40 to a pressure source 41 and through relief valve 42 to the atmosphere, for automatic inflation and deflation respectively, when the pressure in bags 17, 171 departs from the desired value. The inflation pressure can thus be maintained substantially constant or can be varied to suit different relative ambient pressures above and below the wing. The wing-receiving slot 12 is bounded on its upper side by a structural member 19 and on its lower side by a structural member 20.

Referring now to FIG. 2, which illustrates an embodiment suitable for a substantially flat-sided fuselage, a series of wedge-shaped bags 17 are arranged in the mouth of the slot 12 with their apexes pointing inwards, forming the upper seal 13, whilst a further series of bags 171 is similarly arranged to form the lower seal 14. Further inflatable wedge-shaped bags, illustrated at 21 and 22, with their apexes pointing outwards, are located to fill the gap between the bags 17 and 171 and the structural members 19 and 20 and thereby maintain the bags 17 and 171 in position. The bags 17 and 171 are attached to the lips of the slot (23 and 24 respectively) and the bags 21 and 22 are attached to the members 19 and 20. The contiguous bags (171 and 22 and 17 and 21) may also be connected together.

FIG. 3 illustrates an embodiment suitable for a convex fuselage contour. The lower seal 14 is, in this example, formed of a single row of bags 171 directly attached to the lip 24 of the slot 12 and/or to the member 20. The upper seal 13 consists of two rows of bags 17, both rows of bags having their apexes pointing inward. Individual bags of the superimposed rows are connected together and the upper row may be connected to the lip 23 of the slot 12.

The upper seal 13 is held in position by two further rows of bags 25 and 26 having their apexes pointing outward. Individual bags of these rows may be connected together and may be connected to the lip 23 of the slot 12 and/or to the structural member 19.

FIGS. 4 and 5 illustrate a design suitable for a convex fuselage contour, but where the upper fuselage structure 15 is not designed to transmit loads due to wing sweep movements or flexing. It will be appreciated that as the wing moves adjacent the seals illustrated in FIGS. 2 and 3, bag compression loads will be passed through to the structural members 19 and 20. In the embodiment of FIGS. 4 and 5 this is not desirable although a strengthened area is provided along the lip 23 of the slot 12. The strengthened lip 23 makes possible an arrangement whereby the bag 17, disposed in two rows forming the upper seal 13, are mounted on a sheet of thin gauge light alloy which is mounted upon a framework 27. This framework is illustrated specifically in FIG. 6. It consists of a substantially rectangular wire or tubular light alloy structure with "Warren girder" internal bracing 272, pivoted by hinges 273 along one edge 271 to the lip 23 of the slot. The lower seal 14 comprises a single row of bags 171 as before.

Two inflatable bags 28 and 29 are located between the framework 27 and the structural member 19 at a point where the structural member 19 is reinforced. In the embodiment of FIGS. 4 and 5, this is at the rear end of the slot 12. These bags 28 and 29 are of similar design and shape to the bags 17 and serve resiliently to locate the framework 27 and its associated bags 17 in the desired angular relationship with the fuselage structure 15 generally. The framework 27 is designed to be elastically deformable so that as the wing 10 moves into the slot 12 the varying thickness of its aerofoil section may be taken into account. This deformation is illustrated at 30 (FIG. 6).

In each embodiment, slightly stretched skins 31, 32 cover the bags 17, 171 and give a uniform surface to the upper and lower seals when the individual bags 17, 171 are fully inflated.

In addition to being wedge-shaped as seen in a transverse cross-section of the aircraft, the bags 17 and 171 and possibly also the bags 21, 22, 25, 26 and 29, may be tapered as seen in plan view, so as to follow the contour of a fuselage which is itself tapered in plan in the vicinity of the slot 12.

In each of the embodiments illustrated allowance can be made for vertical movements of the wing, for example flexing caused by aerodynamic loads, by a gas cross-flow system between the upper and lower seals. This system provides means whereby gas compressed by wing movement against one seal can be passed to the opposing seal which may require such inflation to hold it against the wing surface, or by using separate relief valves 42 thus venting the compressed seal while the pressure source 41 tops up the opposing seal.

In the embodiment of FIGS. 4, 5 and 6, vertical movement of the wing is also compensated for by the resilient movement of the framework 27 as controlled by the inflatable bags 28 and 29.

Material for the inflatable bags 17, 171, 21, 22, 25, 26, 28 and 29 is, for example, a light woven nylon fabric with a fine neoprene or polyurethane coating. Material for the outer skin covers of the seal (31 and 32) is, for example, nylon woven fabric with a neoprene or a polyurethane coating giving a more rigid surface.

In operation, the wing trailing edge enters the slot 12 at the facing surfaces of the upper and lower seals 13, 14. As the wing sweep-back is increased, the bags 17, 171 adjacent the wing surface will crush and allow entry although their internal pressure is still such as to ensure close contact with the wing. As before referred to, some deflation of the bags will be necesary due to the decrease in volume caused by the crushing effect, and the pressure relief valves 42 are incorporated in the system for this purpose. As the thicker portion of the wing intrudes, the adjacent bags 17, 171 will crush further as will the bags (21, 22, 25, 26 etc.) supporting the seals until the wing 10 is fully housed.

The seal is established at whatever position the wing comes to rest.

When the wing is swept forward again, the bags are fully reinflated from the pressure source 41 through the non-return inlet valve 40.

In the embodiment of FIGS. 4 to 6, the initial crushing effect on the lips of the seals is similar to that described above, but as the wing 10 intrudes further the framework 27 is deflected progressively due to its elasticity and eventually accommodates the wing thickness by swinging upward against the spring action of bags 28 and 29. In this case the part of the seal attached to the framework 27 will be drawn inwards slightly from the fuselage outer contour but this can have a beneficial aerodynamic effect during trans-sonic and supersonic flight.

What I claim as my invention and desire to secure by Letters Patent is:

1. An aircraft having wings whose sweep-back can be varied, the trailing edges of the wings entering into slots in the sides of the fuselage as the angle of sweep-back is increased, wherein each slot is provided with a seal comprising a number of wedge-shaped inflatable bags mounted within the slot with their apexes pointing into the interior of the fuselage, said seal having upper and lower portions, disposed respectively above and below the median plane of the wing sweep movement, each said portion comprising one or more rows of the wedge-shaped bags, said wedge-shaped bags constituting the upper and lower portions of the seal being secured to the upper and lower lips of the slot in the side of the fuselage at the exterior portions of said slot whereby a continuous, non-broken surface is achieved for all possible wing positions, between said fuselage and said seal and, so that, when the bags are inflated and the wing is in its position of minimum sweep-back, the bags fill the slot opening and their external surfaces conform with the fuselage contour, while the bags are capable of yielding resiliently to admit the trailing edge of the respective wing when the angle of sweep-back is increased.

2. An aircraft according to claim 1, wherein the upper and lower portions of the seal are each covered on the surface exposed to the airstream by a continuous stretched skin giving a relatively smooth surface when the bags are inflated.

3. An aircraft according to claim 1, wherein the slot has upper and lower walls extending into the interior of the fuselage, and further wedge-shaped inflatable bags with their apexes outermost are interposed to fill the space between at least one of said walls and the adjacent row of the first-mentioned bags.

4. An aircraft according to claim 1, wherein the wedge-shaped bags constituting one of the portions of the seal are secured to a torsionally flexible framework hinged to the adjacent lip of the slot in the side of the fuselage.

5. An aircraft according to claim 4, wherein further wedge-shaped inflatable bags with their apexes outermost are interposed between the framework and a structural member of the fuselage.

6. An aircraft according to claim 1, wherein the interiors of the bags are interconnected and are in communication with means for maintaining the inflation pressure substantially constant.

7. An aircraft according to claim 6, wherein the said means comprise a relief valve venting to atmosphere and a source of pressure connected to the interiors of the bags via a non-return valve, and a pressure reducing valve.

8. An aircraft comprising a fuselage and wings, the sweep-back of the wings being adapted to be varied, a slot on opposite sides of said fuselage for receiving said wings, the trailing edges of the wings entering into said slots as the angle of sweep-back is increased, adjacent rows of inflatable bags for sealing each slot, said rows being disposed above and below the median plane of wing sweep and capable of yielding resiliently to admit the trailing edge of the respective wing, said inflatable bags further being wedge-shaped with their apexes pointing into the interior of the fuselage, their external surfaces conforming generally with the external contour of the fuselage adjacent the respective slot, a torsionally flexible, substantially rectangular framework extending along the length of each slot and pivoted on a longitudinal axis near the upper lip of the slot, said framework supporting the inflatable bags above the median plane of wing sweep whereby entry of an inner portion of the trailing edge of the wing into the forward part of the slot causes flexing of the framework and the formation of a gap of the correct shape to receive further portions of the trailing edge of the wing on increase of wing sweep-back.

9. An aircraft according to claim 8, further comprising resilient means in compression between the rear part of the flexible framework and the upper wall of the slot, whereby said rear part of the framework is resiliently restrained against upward pivotal movement.

10. An aircraft according to claim 9, wherein said resilient means comprise at least one further inflatable bag.

11. An aircraft according to claim 8, further comprising two superposed rows of said inflatable bags above the median plane of wing sweep.

12. An aircraft according to claim 8, further comprising a flexible metal sheet between the flexible framework and said inflatable bags above the median plane of wing sweep.

13. An aircraft according to claim 8, further comprising a gas cross-flow system between the upper and lower rows of bags.

14. An aircraft according to claim 8, further comprising pressure relief valves and means for connecting the interiors of said inflatable bags with said pressure relief valves, whereby air is allowed to escape when the bags are compressed by entry of the trailing edge of the wing into the slot on increase of wing sweep-back, and further having a pressure source and a non-return inlet valve whereby air is re-introduced into the bags when the wing sweep-back is reduced.

References Cited

UNITED STATES PATENTS

| | | | |
|---|---|---|---|
| 2,327,046 | 8/1943 | Hunter | 244—134 X |
| 2,422,624 | 6/1947 | Hunter | 244—134 |
| 2,684,818 | 7/1954 | Alexanderson | 244—134 |
| 3,359,687 | 12/1967 | Wallace | 49—477 |

FOREIGN PATENTS 832,181  4/1960  Great Britain.

MILTON BUCHLER, Primary Examiner

J. L. FORMAN, Assistant Examiner

U.S. Cl. X.R.

244—43, 130